(12) United States Patent
Huo

(10) Patent No.: US 9,325,415 B2
(45) Date of Patent: Apr. 26, 2016

(54) METHOD AND SYSTEM FOR WIRELESS TRANSMISSION OF ANALOG SIGNALS BETWEEN ANTENNA AND BASEBAND PROCESSOR

(75) Inventor: David Huo, Iselin, NJ (US)

(73) Assignee: ZTE (USA) Inc., Austin, TX (US)

( * ) Notice: Subject to any disclaimer, the term of this patent is extended or adjusted under 35 U.S.C. 154(b) by 50 days.

(21) Appl. No.: 14/131,627

(22) PCT Filed: Jun. 28, 2012

(86) PCT No.: PCT/US2012/044587
§ 371 (c)(1),
(2), (4) Date: May 6, 2014

(87) PCT Pub. No.: WO2013/009483
PCT Pub. Date: Jan. 17, 2013

(65) Prior Publication Data
US 2014/0255034 A1 Sep. 11, 2014

Related U.S. Application Data

(60) Provisional application No. 61/505,769, filed on Jul. 8, 2011.

(51) Int. Cl.
*H04B 10/2575* (2013.01)
*H04J 14/02* (2006.01)
*H04Q 11/00* (2006.01)

(52) U.S. Cl.
CPC ...... *H04B 10/25752* (2013.01); *H04J 14/0241* (2013.01); *H04Q 11/0067* (2013.01)

(58) Field of Classification Search
CPC .......... H04B 10/25752; H04J 14/0241; H04Q 11/0067

USPC .................... 398/82, 115, 118, 139
See application file for complete search history.

(56) References Cited

U.S. PATENT DOCUMENTS 5,724,169 A * 3/1998 LaGasse ............... 398/141
6,674,966 B1 * 1/2004 Koonen ............... 398/70
(Continued)

FOREIGN PATENT DOCUMENTS

| CA | 2761388 A1 | 2/2011 |
|---|---|---|
| EP | 1827036 A1 | 8/2007 |

(Continued)

OTHER PUBLICATIONS

International Search Report for PCT/US2012/044587 mailed Dec. 26, 2012.

*Primary Examiner* — Dalzid Singh
(74) *Attorney, Agent, or Firm* — Drinker Biddle & Reath LLP

(57) ABSTRACT

A wireless communication method and system utilizing optical transmission technology to transport analog signals directly to/from the antenna, without ADC/DAC, so that the optical transport facility can be utilized more efficiently and there is no need to adapt the digital data rate to the transport capacity, as the analog transmission is independent of the digits buried in the given spectrum. Complicated operation is moved into a centralized location, so that a cell site (base station) is light and flexible. In contrast, the standardized approach in the industry, which involves digitized interface between the antenna and the control processor, hits capacity limits of the current transport technology.

36 Claims, 20 Drawing Sheets

(56) References Cited

U.S. PATENT DOCUMENTS

| | | |
|---|---|---|
| 2002/0141046 A1 | 10/2002 | Joo et al. |
| 2006/0083512 A1* | 4/2006 | Wake ............................... 398/59 |
| 2008/0145056 A1* | 6/2008 | Boldi et al. ..................... 398/96 |
| 2010/0054735 A1* | 3/2010 | Wei et al. ........................ 398/26 |
| 2010/0215368 A1* | 8/2010 | Qian et al. ...................... 398/67 |
| 2011/0134972 A1 | 6/2011 | Zhu et al. |
| 2011/0149908 A1 | 6/2011 | Olsson et al. |
| 2011/0268449 A1* | 11/2011 | Berlin et al. .................. 398/115 |
| 2013/0288752 A1 | 10/2013 | He et al. |
| 2015/0023444 A1* | 1/2015 | Tarlazzi et al. ............... 375/267 |

FOREIGN PATENT DOCUMENTS

| | | |
|---|---|---|
| JP | 2002319903 A | 10/2002 |
| JP | 2005094263 A | 4/2005 |
| JP | 2007060311 A | 3/2007 |
| JP | 2007228579 A | 9/2007 |
| JP | 2010087921 A | 4/2010 |
| WO | WO-2010048871 A1 | 5/2010 |

* cited by examiner

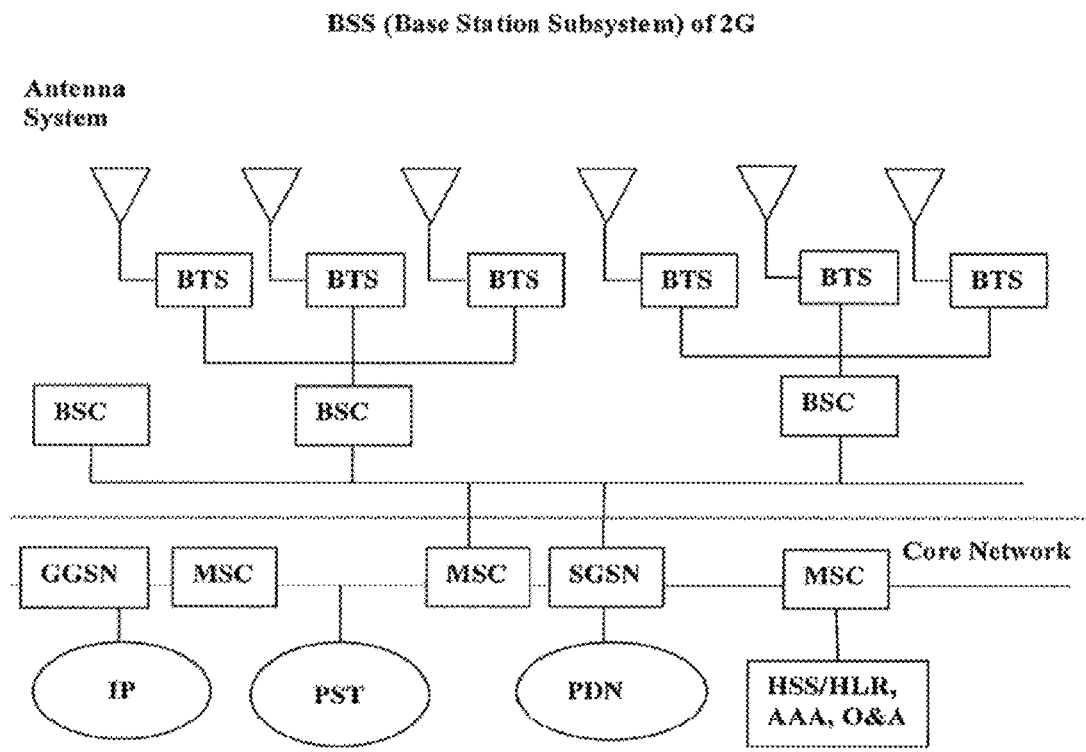
Figure 1: 3G Wireless Network Architecture Overview of 3GPP Standards

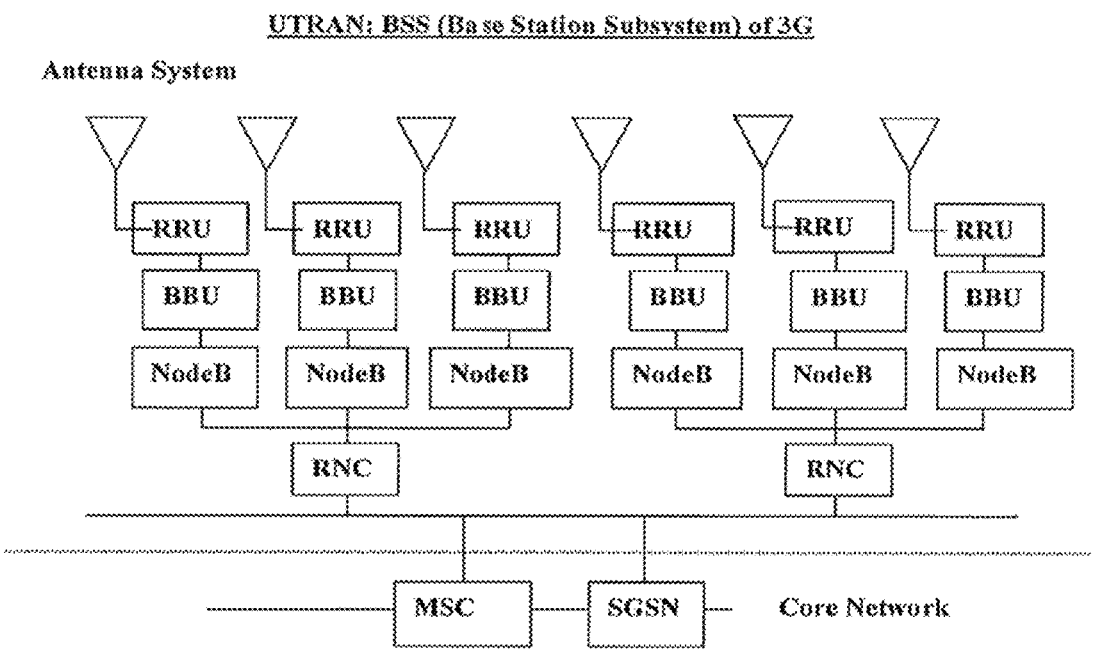
Figure 2: 3G RAN Architecture of 3GPP Standards

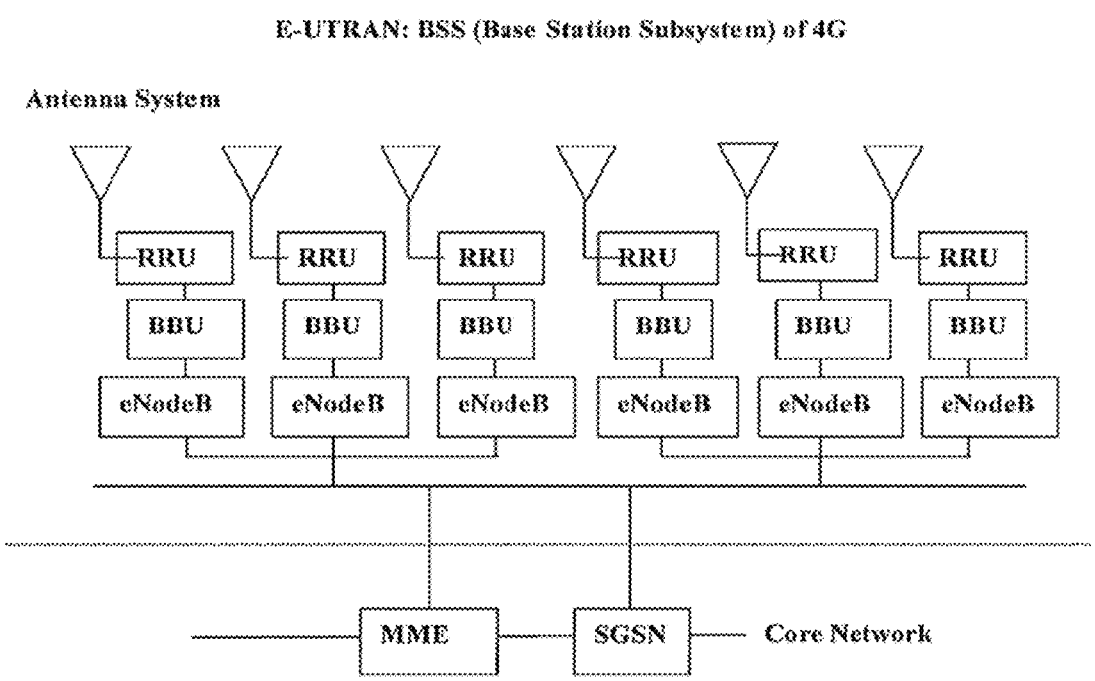
Figure 3: 4G RAN Architecture

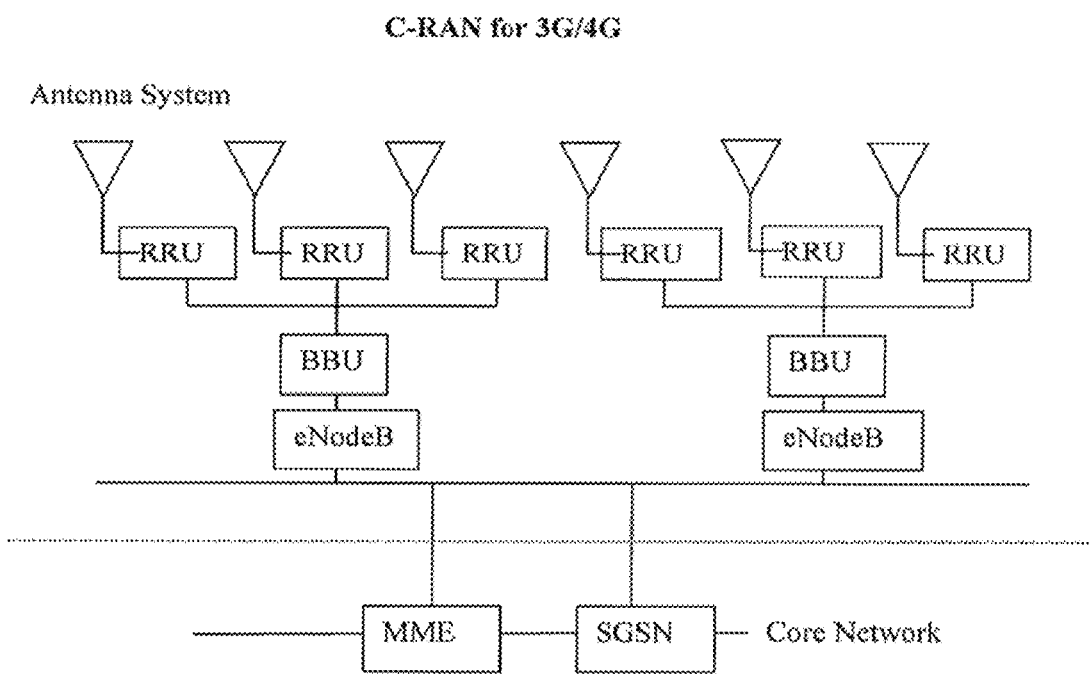
Figure 4: Cloud RAN Concept (C-RAN)

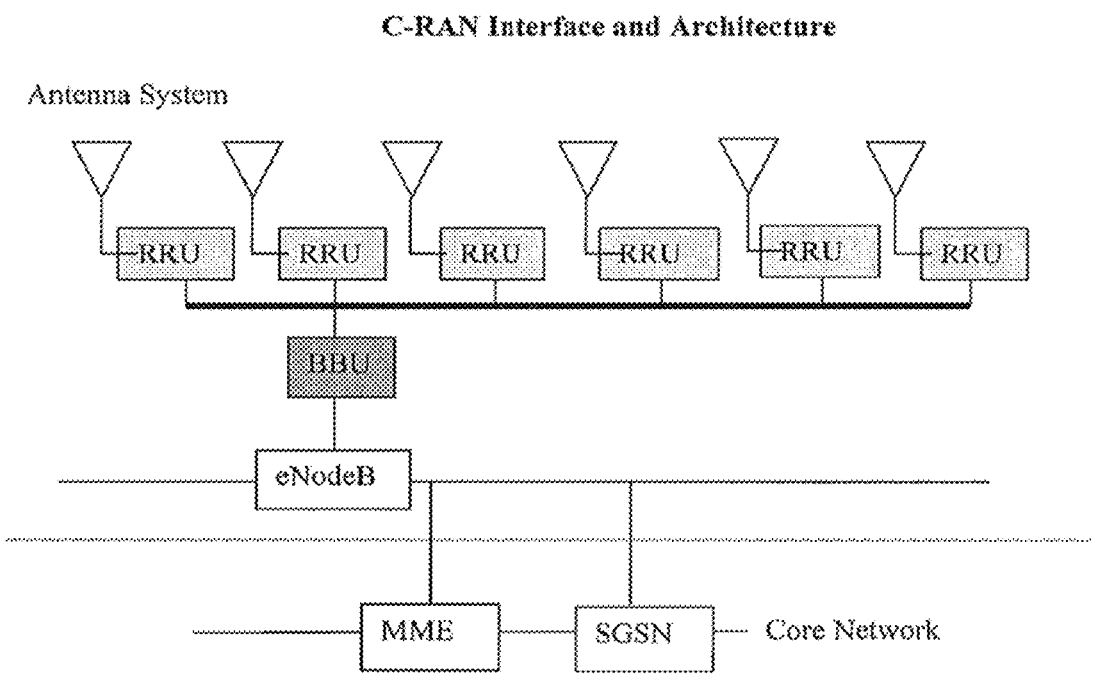
Figure 5: C-RAN architecture and interface

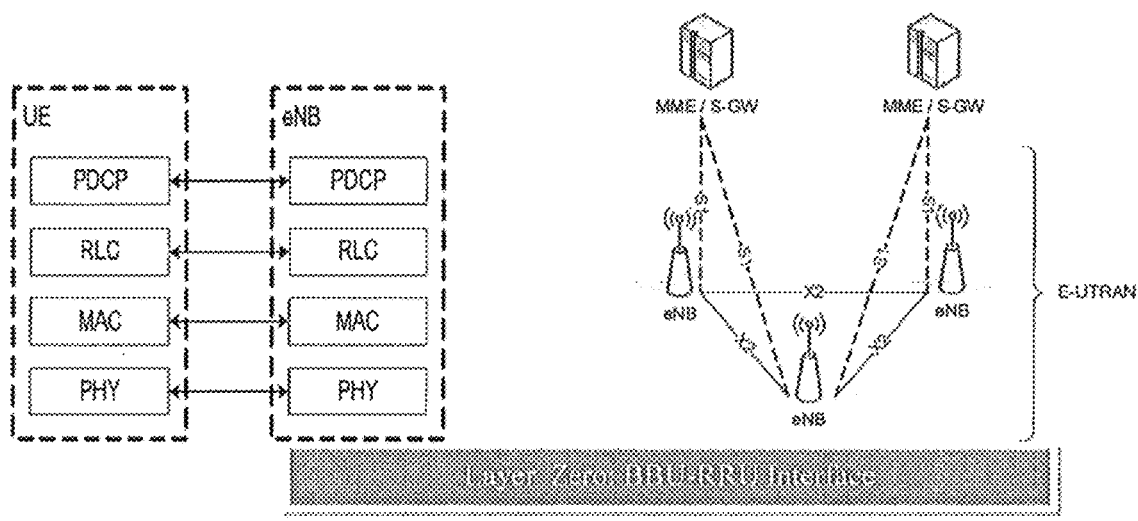
Figure 6: Location of C-RAN interface in the protocol stack architecture of 3GPPFigure: RAN Protocol Stack

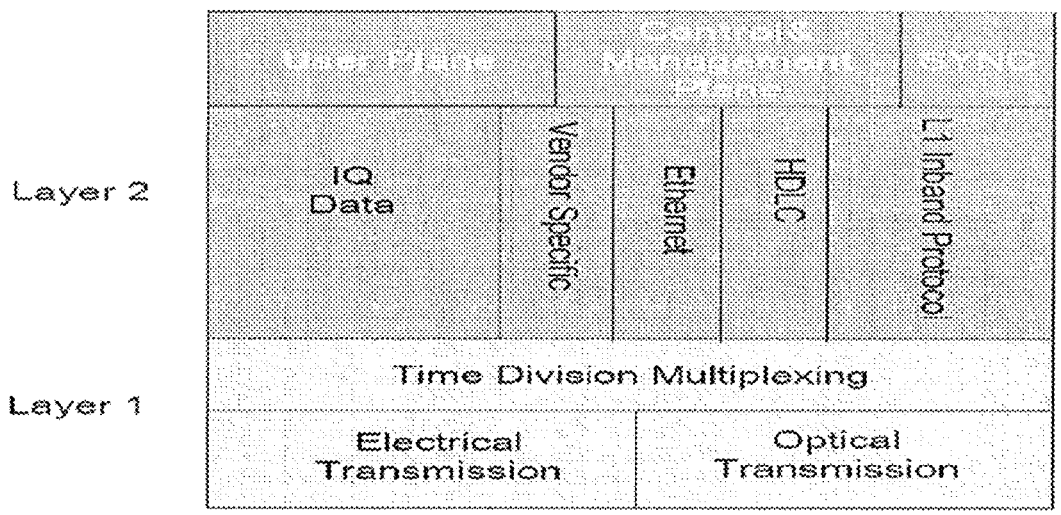
Figure 7: CPRI functionality and protocol stack

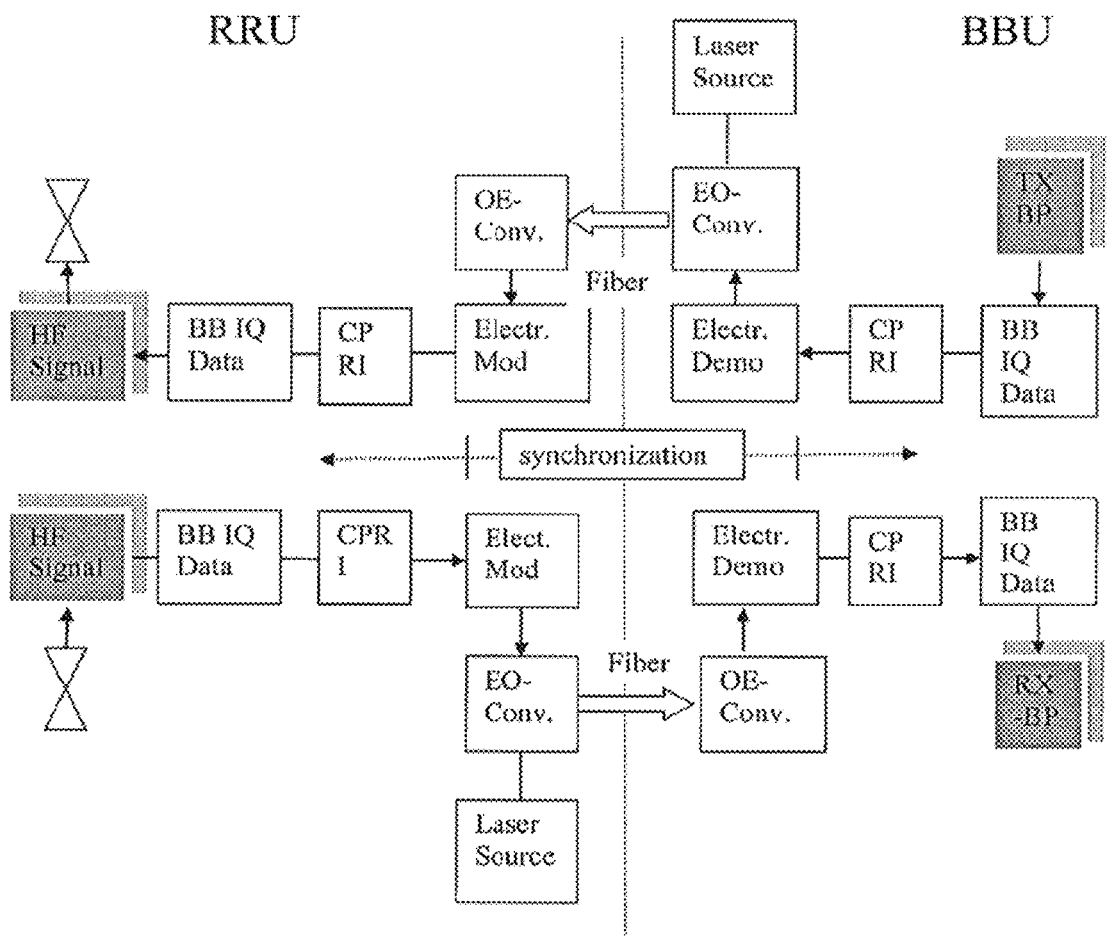
Figure 8: Digital RRU-BBU link

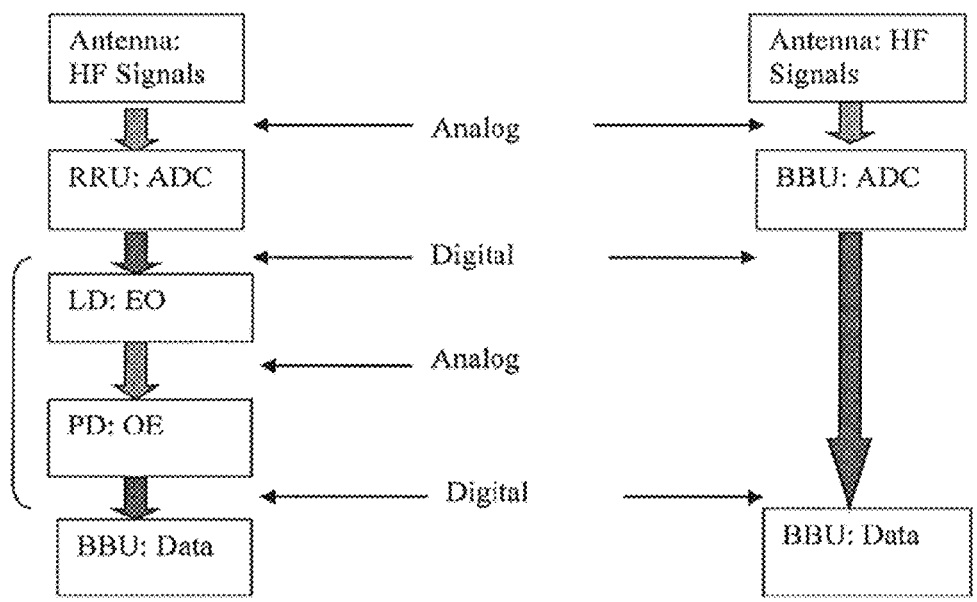
Figure 9: Anatomy of the antenna to base station link: left =with CPRI, right=direct feeding

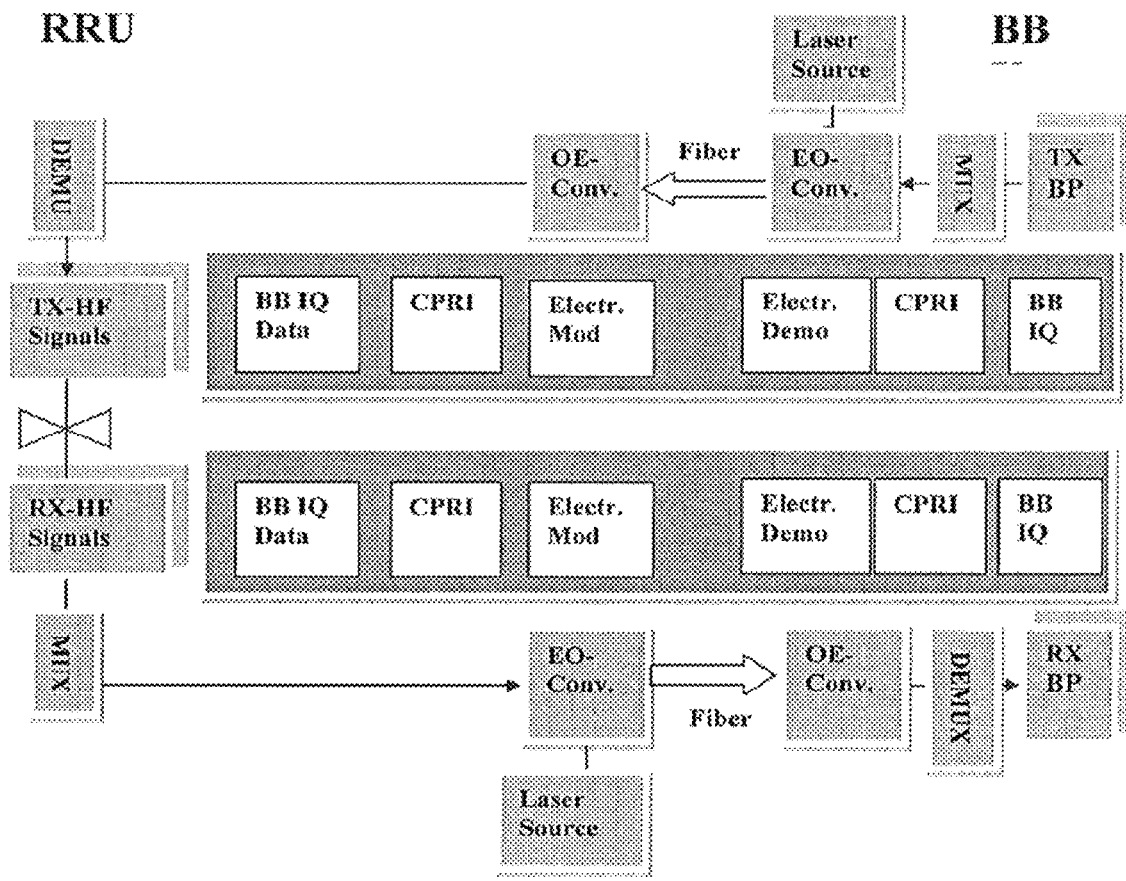
Figure 10: Analog RRU-BBU link

| ITU Grid Channels (100 GHz Spacing) ||||||
|---|---|---|---|---|---|
| Channel | Frequency (GHz) | Wavelength (nm) | Channel | Frequency (GHz) | Wavelength (nm) |
| 1 | 190,100 | 1577.03 | 38 | 193,800 | 1546.92 |
| 2 | 190,200 | 1576.20 | 39 | 193,900 | 1546.12 |
| 3 | 190,300 | 1575.37 | 40 | 194,000 | 1545.32 |
| 4 | 190,400 | 1574.54 | 41 | 194,100 | 1544.53 |
| 5 | 190,500 | 1573.71 | 42 | 194,200 | 1543.73 |
| 6 | 190,600 | 1572.89 | 43 | 194,300 | 1542.94 |
| 7 | 190,700 | 1572.06 | 44 | 194,400 | 1542.14 |
| 8 | 190,800 | 1571.24 | 45 | 194,500 | 1541.35 |
| 9 | 190,900 | 1570.42 | 46 | 194,600 | 1540.56 |
| 10 | 191,000 | 1569.59 | 47 | 194,700 | 1539.77 |
| 11 | 191,100 | 1568.77 | 48 | 194,800 | 1538.98 |
| 12 | 191,200 | 1567.95 | 49 | 194,900 | 1538.19 |
| 13 | 191,300 | 1567.13 | 50 | 195,000 | 1537.40 |
| 14 | 191,400 | 1566.31 | 51 | 195,100 | 1536.61 |
| 15 | 191,500 | 1565.50 | 52 | 195,200 | 1535.82 |
| 16 | 191,600 | 1564.68 | 53 | 195,300 | 1535.04 |
| 17 | 191,700 | 1563.86 | 54 | 195,400 | 1534.25 |
| 18 | 191,800 | 1563.05 | 55 | 195,500 | 1533.47 |
| 19 | 191,900 | 1562.23 | 56 | 195,600 | 1532.68 |
| 20 | 192,000 | 1561.42 | 57 | 195,700 | 1531.90 |
| 21 | 192,100 | 1560.61 | 58 | 195,800 | 1531.12 |
| 22 | 192,200 | 1559.79 | 59 | 195,900 | 1530.33 |
| 23 | 192,300 | 1558.98 | 60 | 196,000 | 1529.55 |
| 24 | 192,400 | 1558.17 | 61 | 196,100 | 1528.77 |
| 25 | 192,500 | 1557.36 | 62 | 196,200 | 1527.99 |
| 26 | 192,600 | 1556.55 | 63 | 196,300 | 1527.22 |
| 27 | 192,700 | 1555.75 | 64 | 196,400 | 1526.44 |
| 28 | 192,800 | 1554.94 | 65 | 196,500 | 1525.66 |
| 29 | 192,900 | 1554.13 | 66 | 196,600 | 1524.89 |
| 30 | 193,000 | 1553.33 | 67 | 196,700 | 1524.11 |
| 31 | 193,100 | 1552.52 | 68 | 196,800 | 1523.34 |
| 32 | 193,200 | 1551.72 | 69 | 196,900 | 1522.56 |
| 33 | 193,300 | 1550.92 | 70 | 197,000 | 1521.79 |
| 34 | 193,400 | 1550.12 | 71 | 197,100 | 1521.02 |
| 35 | 193,500 | 1549.32 | 72 | 197,200 | 1520.25 |
| 36 | 193,600 | 1548.51 | 73 | 197,300 | 1519.48 |
| 37 | 193,700 | 1547.72 | | | |

Telecom Engineering, Inc.    www.telecomengineering.com    888-250-1562

Figure 10.5: L-band laser spectrum grid

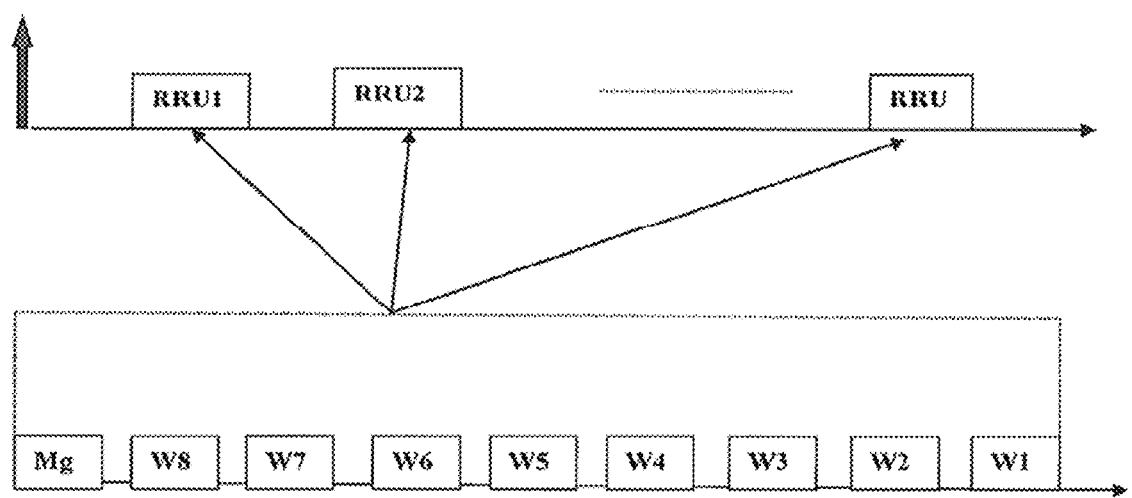
Figure 11: Carrier spectrum for MIMO capable LTE RF signals

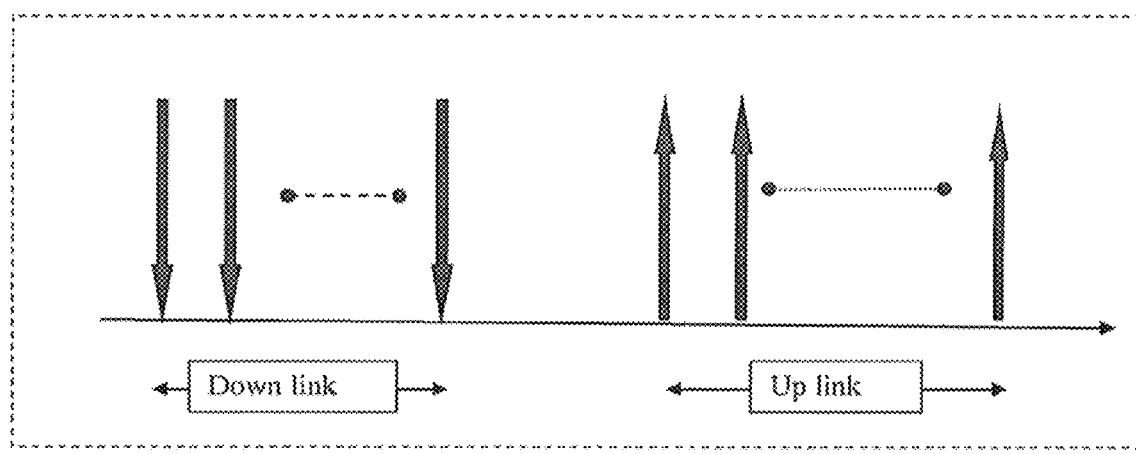
Figure 12: C-Band Laser Spectrum utilization

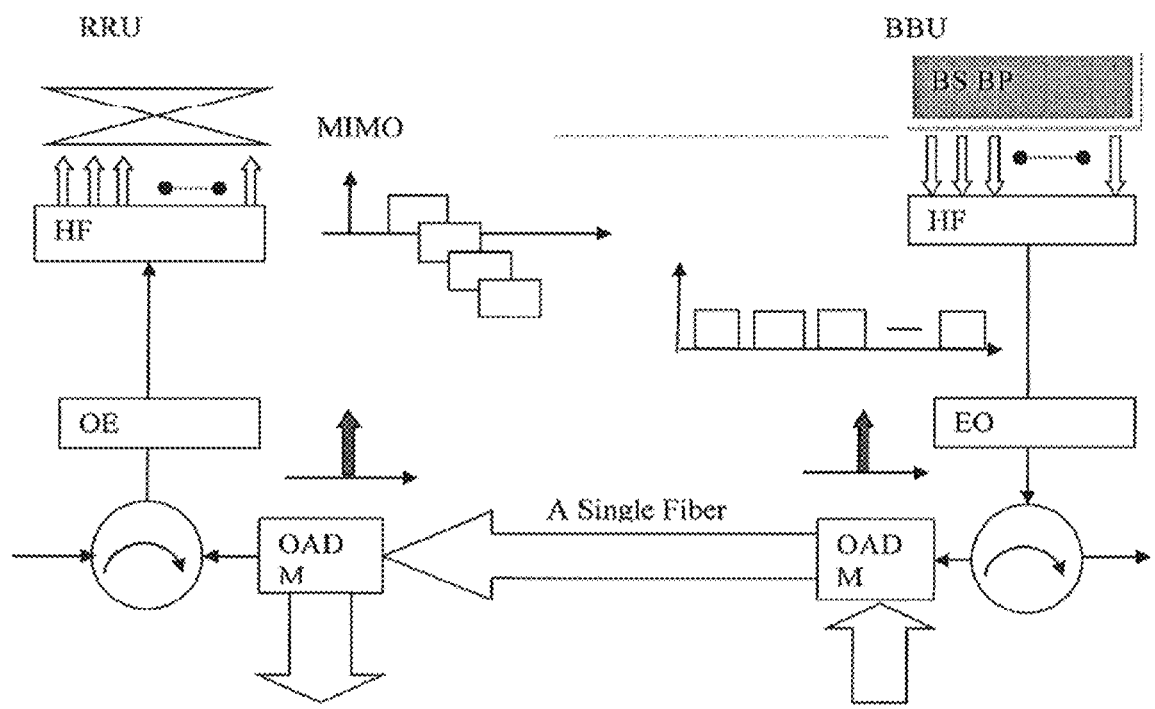
Figure 13: Circuit for Optical Transmission: BBU to RRU (down link)

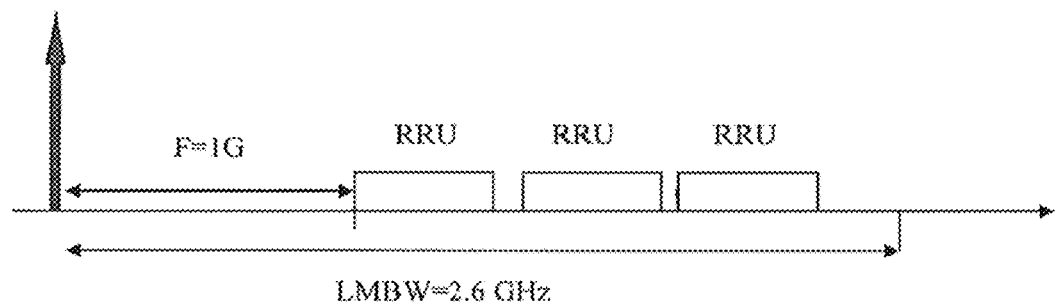
Figure 14: Realistic Multiplex
| F | G | W | M | LMBW | RRUs/lambda | RRUs/fiber |
|---|---|---|---|------|-------------|------------|
| 0.1 | 0.02 | 0.02 | 4 | 2.6 | 16 | 234 |
| 0.1 | 0.04 | 0.04 | 4 | 2.6 | 8 | 117 |
| 0.1 | 0.08 | 0.08 | 4 | 2.6 | 4 | 59 |
| 0.1 | 0.1 | 0.1 | 4 | 2.6 | 3 | 47 |
| 0.1 | 0.02 | 0.02 | 8 | 2.6 | 8 | 117 |
| 0.1 | 0.04 | 0.04 | 8 | 2.6 | 4 | 59 |
| 0.1 | 0.08 | 0.08 | 8 | 2.6 | 2 | 29 |
| 0.1 | 0.1 | 0.1 | 8 | 2.6 | 2 | 23 |
| 0.1 | 0.02 | 0.02 | 2 | 2.6 | 31 | 469 |
| 0.1 | 0.04 | 0.04 | 2 | 2.6 | 16 | 234 |
| 0.1 | 0.08 | 0.08 | 2 | 2.6 | 8 | 117 |
| 0.1 | 0.1 | 0.1 | 2 | 2.6 | 6 | 94 |
Figure 14.5 Different configuration and capacity per fiber, assume 30 lambdas generated with modulation bandwidth 2.6GHz and LTE band usage

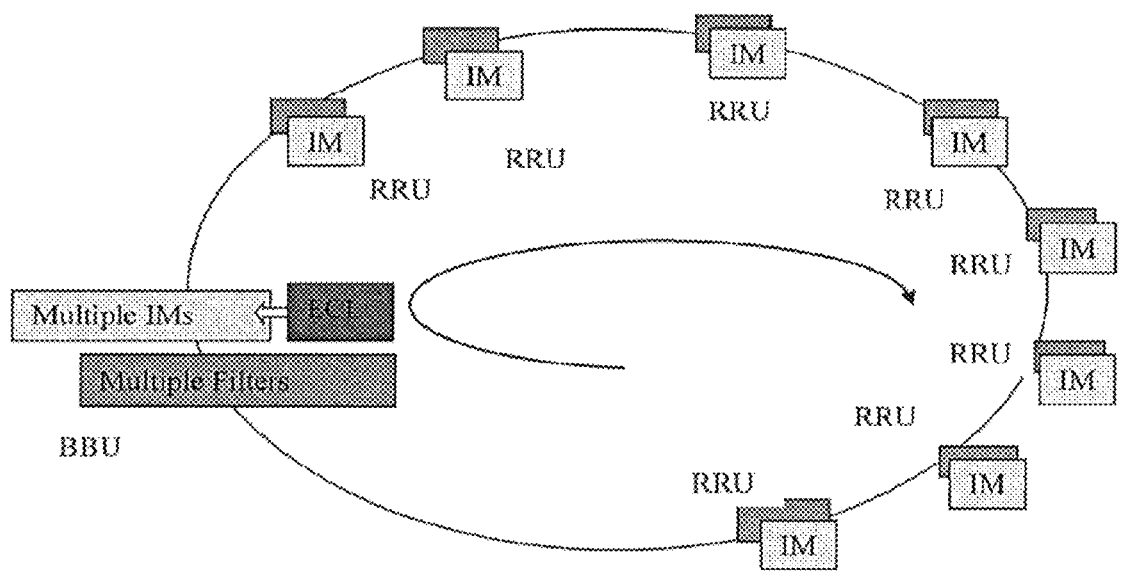
Figure 15: A ring of a single fiber linking all RRUs associated with a single BBU

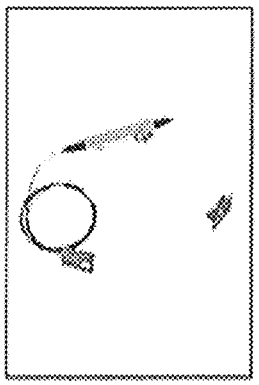

Features

- C- and L-Band Operation Range
- 300-Pin MSA Transponder Compatible Footprint
- Titanium Indiffused X-Cut Lithium Niobate
- Low Drive Voltage
- Long-Term Bias Stability
- Telcordia GR-468 Compliant
- Integrated Photodetector

| Parameter | Min | Max |
|---|---|---|
| Operating Wavelength* | 1525 nm | 1605 nm |
| PRBS** Optical Extinction Ratio | 13 dB | - |
| Bit Rate Frequency | 9.953 Gb/s | - |
| E/O Bandwidth (-3 dB) | 10 GHz | - |

\* See Note Below
\*\* Pseudo Random Binary Sequence

Fig. 15.5 Technology to enable WDM-RAN

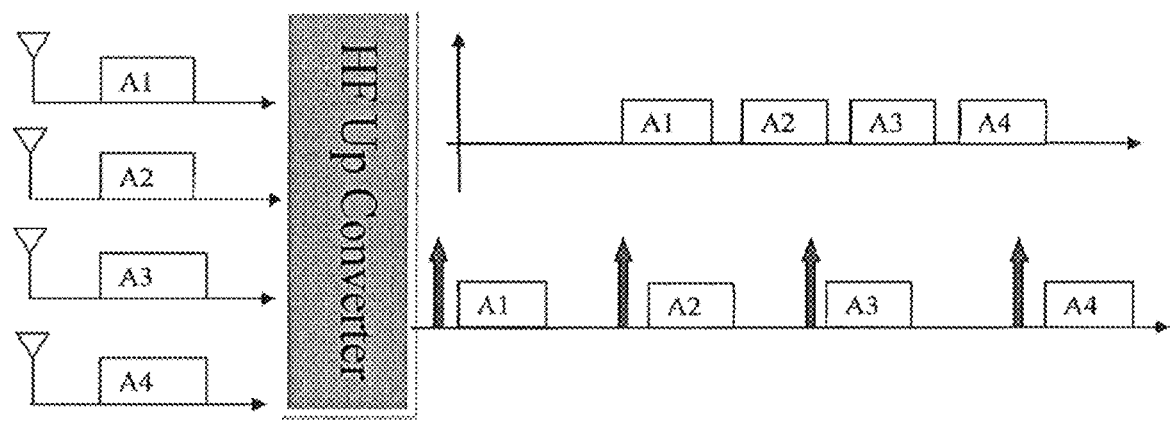
Figure 16: HF Converter

| CPRI Transmission Capability | | |
|---|---|---|
| CPRI configuration | One carrier I/Q data throughput | One fiber capacity |
| 1.2288Gbps | 81.25Mbps / Carrier /(2 Antenna) | 24X0.2MHz |
| 2.4576Gbps | | 48X0.2MHz |
| 6.144Gbps | | 120X0.2MHz |
| 1.2288Gbps | 307.2Mbps / Carrier / (2 Antenna) | 4 X 5MHz (1T2R/2T2R) |
| 2.4576Gbps | 307.2Mbps / Carrier / (2 Antenna) | 8 X 5 MHz (2T4R/4T4R) |
| 2.4576Gbps | 2.43Gbps / 20MHz / (2 Antenna) | 1 X 20MHz |
| 10Gbps | | 4X 20MHz |
| 6.144Gbps | 819.2Mbps / Carrier / (8 Antenna) | 15 X 1.5MHz (8T8R) |
| 10Gbps | 9.83Gbps / 20MHz / (8 Antenna) | 1 X 20MHz |

Figure 17: CPRI Transmission Capability

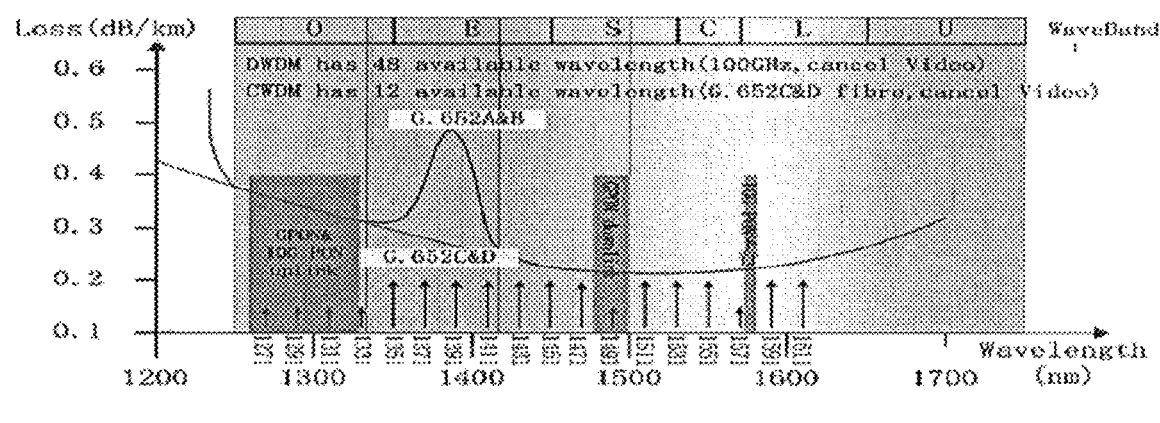
| s | Descriptor | Range (nm) |
|---|---|---|
| O | Original | 1260 to 1360 |
| E | Extended | 1360 to 1460 |
| S | Short wavelength | 1460 to 1530 |
| C | Conventional | 1530 to 1565 |
| L | Long wavelength | 1565 to 1625 |
Figure 18: Transmission Capability

METHOD AND SYSTEM FOR WIRELESS TRANSMISSION OF ANALOG SIGNALS BETWEEN ANTENNA AND BASEBAND PROCESSOR

CROSS-REFERENCE TO RELATED APPLICATIONS

This application is a national stage application (under 35 U.S.C. §371) of PCT/US2012/044587, filed Jun. 28, 2012, claiming the priority of U.S. Provisional Application No. 61/505,769, filed Jul. 8, 2011, the contents of which are incorporated herein by reference in their entirety.

BACKGROUND

1. Field of the Invention

The field of the present invention relates to wireless communication. Specifically, the field of the invention relates to the optical transmission of analog signals between antenna and a baseband processor via fiber.

2. Background of the Invention

Second generation (2G) cellular radio networks consist of three deployment hierarchy layers: the base transceiver station (BTS), the base station controller (BSC), and the mobile switching center (MSC). The part comprising BSC, BTS, and antenna is called the base station subsystem (BSS). The evolution of the BSS has been a major focus of the radio access network (RAN) standardization by Special Mobile Group 5 (SMG5) and later 3rd Generation Partnership Project (3GPP).

Third generation (3G) cellular radio networks inherited this architecture, albeit simplified, in which the BSC is removed (i.e., the function is split into the MSC and the BTS), and the BTS is directly connected to the gateway of the core network. In practice, the remote radio unit (RRU) and the base band unit (BBU) are separated (i.e., functionally separated into two products). As such, the intensive software processing of the base band data is separated from the high frequency (HF) signal reception. The most used interface between the RRU and the BBU is Common Public Radio Interface or Ir. For 2G systems, RRUs are mostly collocated with BBUs. But for 3G systems, RRUs are separately located (i.e. RRUs are installed on top of transmit towers, while BBUs are installed in equipment rooms at the foot of the towers). In this way, one BBU can support multiple RRUs, and so digital signal processing facilities can be concentrated. FIG. 1 shows an overview of 3G wireless network architecture and FIG. 2 shows 3G RAN architecture. Both figures are shown according to 3GPP standards.

Fourth generation (4G) cellular radio networks continue this trend by further flattening the architecture. For example, an evolved nodeB (eNB) is directly connected to the mobility management entity (MME) (core network), and multiple antennas in different locations can be connected to eNB. FIG. 3 illustrates 4G RAN architecture.

The trend is continued by the Cloud-RAN (C-RAN) concept, where optical fibers are large-scale deployed to further concentrate the BBU resources. As such, more and more RRUs can be supported by a single BBU, allowing the internet protocol (IP) technology of cloud computing to enhance processing power and flexibility. This results in reduced power consumption and dynamic resource allocation in the cellular network. FIG. 4 illustrates C-RAN architecture.

As shown in FIG. 5, C-RAN is characterized by the aggregation of multiple cell sites via optical fibers and centralized base band processing. C-RAN architecture saves structures, power supplies, and maintenance at the cell sites, while at the same time enabling better inter-cell/sector cooperation and computing facilities. The technical solution is provided by utilizing a new layer-0 (i.e., the layer below the physical layer (according to the International Standard Organization (ISO) communication protocol model)). Because layer-0 is not part of the 3GPP's scope, C-RAN is a non-standard solution.

As further shown in FIG. 5, RRUs are directly connected to the antenna system and, as such, the inputs of the RRUs are raw HF signals. The output of the BBU is base band data needed by the eNodeB/BSC, and hence belongs to Media Access Control (MAC) layer or above. The data between the RRUs and the BBU can take different formats depending on the functional definition and separation between the BBU and the RRUs. FIG. 6 shows the location of C-RAN interface in the protocol stack architecture of 3GPP and a RAN protocol stack.

The interface comprises a transformation to or from HF and then to or from base band (I-Q) digits. The chain of processing essentially consists of four operations: (i) RF-IMF/IMF-RF (where IMF—intermediate frequency—is a digital intermediate frequency signal); (ii) modulation/demodulation; (iii) sampling; and (iv) analog-to-digital conversion/digital-to-analog conversion (ADC/DAC). The four operations can be allocated in either RRU or BBU—the criterion is feasibility and the efficient transportation of the information. A current interface approach is through the so-called CPRI interface. The CPRI standard defines the interface of base stations between the Radio Equipment Controllers (REC) in the standard, to local or remote radio units, known as Radio Equipment (RE).

Functional separation according to the CPRI interface is (1) RRU: RF-IMF/IMF-RF, sampling, ADC/DAC; and (2) BBU: Process I-Q data stream. By this scheme, in the up-link, the modulated RF data coming from the antenna feeder are first down converted to base band where they are digitized with fixed sample rate. The digits are then packetized according to the CPRI protocol. Fiber is used to transport the CPRI packets to the central processing location. FIG. 7 shows CPRI functionality and protocol stack and FIG. 8 shows a digital RRU-BBU link.

A critical issue is the timing of CPRI packets from different RRU locations and the synchronization between the BBU and the connected RRUs. This is particularly difficult for the approach involving CPRI, or any other packet-based transmission protocol, because the data consists of digitized baseband analog signal samples (IQ data) that require very high transmission capacity and time accuracy.

The prior art uses a small form-factor pluggable (SFP) at the optical interface to convert the electrical sample data into optical data. As such, a single fiber is required for each RRU. To improve efficiency, wavelength division multiplexing (WDM) has been deployed to allow sharing of the optical capacity of a single fiber between different RRUs. Despite all however, the CPRI-based aggregation approach is flawed.

First, the HF data has to be digitized at the RRU, creating a huge amount of unprocessed samples subject to transmission over the fiber. As a result, fiber capacity is inefficiently utilized (or quickly exhausted) because raw data is transmitted, as opposed to data from the upper layer; for example, the A-Interface for the backhaul. Second, because of the high data rate, the synchronization is much more stringent than upper layer data, which has more delay budget to absorb any disparity in the synchronization. Third, the transmission chain contains redundant components because analog signal are converted to digits, then the electrical digits are converted to optical analog signals, and then the optical analog signals are again converted into electrical digits. The high capacity of digital data in the middle of the transmission chain adversely affects the transmission system.

In addition, operators are interested in utilizing the Gigabit—capable Passive Optical Network (GPON) access network to carry the CPRI data, but difficulty is encountered because the capacity of GPON can hardly keep up with the demand, leaving no room for sharing with other services, such as fiber to the x (FTTx). Finally, sharing a digital channel in the same infrastructure also causes security concerns for operators. This and other circumstances present problems and obstacles that are overcome by the methods and systems described below.

SUMMARY OF THE INVENTION

The present invention is directed to wireless communication methods and systems which relate to the optical transmission of analog signals between antenna and a baseband processor via fiber. Also, the efficient transmission and aggregation of RRU data for a single BBU is facilitated.

In one aspect of the system and method, a number of MIMO uplink and downlink channels are multiplexed (including a guard band for each channel) and optically transmitted through a fiber. The uplink signal is transmitted on a first carrier and a downlink signal is transmitted on a second carrier. A separation band is included between the uplink signal and the downlink signal.

In another aspect, and more particularly, there is a method (and system) of optical transmission over fiber between a plurality of RRUs and a BBU. The method includes generating a plurality of wavelengths by a laser source, where each wavelength is assigned to at least one RRU. Then, a carrier converter is used to convert a carrier from different antenna ports and a carrier converter is used to convert another carrier directed to the different antenna ports. The carriers are separated by a separation band. Light beams are used to transmit the carriers through a fiber connecting the RRUs and the BBU.

In certain aspects of the described method (and system), 30 wavelengths are generated and the carriers include guard bands corresponding to each port. Optionally, the method includes using a microwave frequency converter to convert antenna interfaces from the antenna ports into adjacent identical frequency bands above a system carrier frequency, assigning the antenna ports to different carriers, and coherently generating the different carriers by single light source. Multiplexing antenna ports from different RRUs into the different carriers is a further optional aspect of the present invention. In another, the plurality of RRUs are connected through a single fiber in the shape of a ring and optical intensity modulators are used for the optical transmission.

In a further aspect of the present invention, there is provided a method (and system) of optical transmission over fiber between a plurality of RRUs and a BBU. The method includes generating a certain amount of wavelengths by a laser source. Then, the wavelengths are separated into uplink wavelengths and downlink wavelengths. The uplink wavelengths are then optically transmitted to the BBU and the downlink wavelengths are optically transmitted to the RRUs. In this embodiment, a separation band is not used to separate the uplink wavelengths and the downlink wavelengths.

In certain aspects of the described method (and system), 30 wavelengths are generated and separated into 15 uplink wavelengths and 15 downlink wavelengths. Optionally, the method includes multiplexing GSM signals with UMTS or LTE. Or using a microwave frequency converter to convert antenna interfaces from antenna ports into adjacent identical frequency bands above a system carrier frequency. Optionally, the present invention includes assigning antenna ports to different light carriers and then coherently generating the different light carriers by a single light source. Antenna ports from different RRUs may further be multiplexed into the different light carriers. In another aspect, the RRUs are connected through a single fiber in the shape of a ring and optical intensity modulators are used for the optical transmission through the fiber.

In yet another aspect of the present invention, an RRU and BBU network is disclosed. The network includes a plurality of RRUs that themselves each include an antenna system configured to receive wireless signals and an electrical-to-optical convertor configured to convert the wireless signal to a corresponding optical signal. The network also includes a BBU having an optical-to-electrical convertor configured to convert the corresponding optical signal to a corresponding electrical signal. Finally, there is a fiber connecting the plurality of RRUs and the BBU. Optionally, the fiber connecting the plurality of RRUs and the BBU is in the shape of a ring.

Additional aspects and advantages of the improvements will appear from the description of the preferred embodiment.

BRIEF DESCRIPTION OF THE FIGURES

Embodiments of the present invention are illustrated by way of the accompanying drawings.

FIG. 1 shows a 3G wireless network architecture overview according to 3GPP standards.

FIG. 2 shows 3G RAN architecture according to 3GPP Standards.

FIG. 3 illustrates 4G RAN architecture.

FIG. 4 illustrates C-RAN architecture.

FIG. 5 illustrates C-RAN architecture and interface.

FIG. 6 shows the location of C-RAN interface in the protocol stack architecture of 3GPP and a RAN protocol stack.

FIG. 7 shows CPRI functionality and protocol stack.

FIG. 8 shows a digital RRU-BBU link.

FIG. 9 illustrates the anatomy of the antenna to base station link: left=with CPRI and right=direct feeding.

FIG. 10 shows an analog RRU-BBU link.

FIG. 10.5 shows an L-band laser spectrum grid.

FIG. 11 shows a carrier spectrum for multiple input, multiple output (MIMO) capable Long-Term Evolution (LTE) RF signals.

FIG. 12 shows a spectrum of C-band laser use.

FIG. 13 shows a circuit for optical transmission: BBU to RRU (down link).

FIG. 14 illustrates realistic multiplex.

FIG. 14.5 illustrates the different configuration and capacity per fiber (assume 30 lambdas generated with modulation bandwidth 2.6 GHz and LTE band usage).

FIG. 15 shows a ring of a single fiber linking all RRUs associated with a single BBU.

FIG. 15.5 illustrates technology to enable WDM-RAN.

FIG. 16 shows a HF converter.

FIG. 17 illustrates CPRI transmission capability.

FIG. 18 illustrates transmission capability.

DETAILED DESCRIPTION OF THE PREFERRED EMBODIMENTS

Certain embodiments of the methods and systems described below overcome some or all of the difficulties described above and facilitate efficient transmission and aggregation of RRU data for a single BBU.

To facilitate effective aggregation, it is important to know whether the transport media at different locations match the traffic demands. Because the central processing lies at the BBU (and the number of RRUs that can be connected with a single BBU is limited), it is critical to know how many RRUs a BBU can connect to in terms of fiber infrastructure. In the CPRI approach, for example, it is very limited. By sharing the infrastructure with other ground systems, resilience and protection become important.

Problems of CPRI-based C-RAN are first described. By using the CPRI version of RRU-BBU link, the HF signals are first digitized to generate the CPRI payload, and then this electrical signal is converted into an optical signal to allow transmission over a light beam. At the receiving side, the optical signal is received as an analog signal and electrically demodulated into digits. FIG. 9 is a comparison of the signal reception/transmission between RRU and BBU. As can be seen, the HF signals pass: ADC+DAC+ADC, instead of merely ADC, where the additional DAC+ADC (corresponding to the optical transmission path) has its own framing, overhead, and protection scheme, which adds to the delay among other things.

Such communication networks, however, have major technical requirements, including reliability and minimum delay. Minimum delay is required because, for example, (i) below the physical layer, there is a tight delay budget given by the standard; (ii) delay is proportional to distance, which is reciprocal to the aggregation size; and (iii) the difficulty of synchronization between different locations. Specifically, minimum frame header (or no frame at all), no interleaving, and no time division multiplexing (TDM) is required.

Reliability is required because, for example, (i) below the physical layer, the antenna feeder is emulated, which has zero probability of no interruption; and (ii) given that current RAN architecture consists of private infrastructure, resilience and protection are under control by RAN operators. Specifically, it is required that the channels used for C-RAN be separate and securely isolated from other channels sharing the same fiber, if any.

Embodiments of the present invention implement WDM-RAN using analog optical channels. Optical transmission over fiber is desirable because of its enormous capacity, which to date has not been fully utilized. For instance, according ITU standards for 100 GHz grid, the C-band window contains 74−38=36 optical light spectral lines that can be generated and transmitted in a single-mode optical fiber (SMF). Current optical systems normally use only one of those, even in WDM. Indeed, use of more than 10 optical light spectral lines does not occur very often, if at all. On the other hand, the wireless signal to be transmitted generally has a 20 MHz bandwidth. Even in the extreme case, the bandwidth is no more than 100 MHz per "carrier." For example, the carrier frequency for LTE can be 700, 800, 900, 2100, or 2600 MHz. Hence it is possible to directly modulate the light beam with the carrier signals. Comparing the channel distance of 100 GHz and the RF frequency of LTE 2.6 GHz, it is evident that it is theoretically possible to transmit many analog RF channels using a single lambda (and more) in a single fiber.

Moreover, modern wireless technology has a complex design in the air interface. For example, the analog signal coming from the antenna feeder may contain multiple ports. As such, MIMO ports must be taken into account. Although a typical configuration of LTE is 4×4 for MIMO, 8×8 is defined in the standard and so should be supported. If 8 ports is considered as the basic configuration, then the required bandwidth for a single carrier is 8*W, where W is the bandwidth (with W=20 MHz, 40 MHz, and 100 MHz; W=5 MHz, 10 MHz, 15 MHz, and 20 MHz for UMTS; W=25 MHz for GSM; and W=22 MHz for Wi-Fi).

When the "channels" are multiplexed in the frequency, a guard band is needed. Therefore, a 20 MHz guard band is added for each W, resulting in 8*(G+W). S=45 MHz to 190 MHz, where S is the separation band between the uplink and the downlink. Thus, where the uplink and the down link are transmitted on the same carrier, the result is 8*(G+W)+S+8*(G+W) in total. In such a case, for example, S=100 MHz should suffice.

FIG. 10 shows an analog RRU-BBU link and FIG. 10.5 shows a L-band laser spectrum grid. FIG. 11 shows a carrier spectrum for MIMO-capable LTE RF signals. FIG. 12 shows a spectrum of C-based laser use. FIG. 13 shows a circuit for optical transmission: BBU to RRU (down link).

The procedure can be summarized as the following optical modulation: Wavelength Division, Carrier Displacement Division, Wavelength Carrier Displacement Division, and Wavelength Antenna Division.

For Wavelength Division, a laser source generates up to 30 wavelengths (i.e., lambdas) having a distance of 100 GHz. In certain embodiments, each lambda is assigned to at least a single RRU, with available bandwidth up to 100 GHz. In this way, thirty RRUs can be connected without frequency multiplexing of multiple RRUs. It is possible to modulate multiple carriers on the same lambda light, however.

For, Carrier Displacement Division, a carrier converter is used at both RRU and BBU sides to up/down convert the carrier from different antenna ports. As a result 8*(G+W) is generated at the BBU and 8*(G+W) is generated at the RRU with a separation of S between the uplink and the down link. The two light beams are sent out from both sides with different carriers (with sufficient guard band S).

When multiple RRUs are multiplexed to a single lambda, the calculation is M*16*(G+W)+S+F. For example, M*16*(100+100)+400+2600=M*3200+3000 MHz<100 GHz. By having given values of G, S, and F, where F is the band reserved for the control channel, the number of RRUs that can be taken care of by the single lambda can be computed. For instance, there can be up to 30*M RRUs for a single fiber, comprising uplink, downlink and control channels for each RRU. In the example above (the upper bound) M=(100−3)/3.2=30.

For, Wavelength Carrier Displacement Division, another approach is to separate the 30 lambdas into 15 lambdas for the uplink and 15 lambdas for the downlink. By doing so, the 15*S separation band needed to separate the uplink and down link is saved. Then, a single lambda can carry M RRUs, such that M*8*(G+W)+F<100 GHz. Then up to 15*M RRUs per single fiber can be accommodated. Since the guard band is saved by this arrangement, a single fiber can support more RRUs. In the example above, it is expected that M*1600+2600<100 GHz, hence M=[(100-2.6)/1.6]=60. This results in a minimal number of total 15*60=900 RRUs supportable by a single fiber. In this configuration, the only bottleneck (if any) is the BBU power. This configuration allows more flexibility of multiplexing different signals through a single fiber. As such, multiplexing signals of GSM (Global System for Mobile Communications) with UMTS, or with LTE, is easily implemented.

Wavelength Antenna Division: In the above methods, a microwave frequency converter is typically used to convert all 8 antenna interfaces into 8 adjacent identical frequency bands above the system carrier frequency (in addition to management channel) before light modulation is carried out. The microwave converter is saved, however, if these 9 channels are assigned to different light carriers. Thus, for each RRU there are A+1=9 light carriers, which can be generated coherently by a single laser source. If L is the number of optical channels for a given lambda, then L/(A+1)=4, when A=8 and L=36 (number of supportable lambdas). As such, 3 to 4 RRUs can be carried without a microwave converter, in the worst case. While different antennas of the same RRU are assigned to different optical channels, antennas from different RRUs can be multiplexed into the same optical carrier, as long the frequency is well-locked and synchronized. If M' is the number of RRUs, then from (W+G)*M'<100 GHz follows M'= [100/(W+G)]=[100/(0.1+0.1)]=500. This makes total M, where 3*500<2*M<4*500, meaning 750<M<1000 in the worst case. The factor 2 accounts for the uplink and down link and G is the guard band between signals from different RRUs. In the case of variable antenna numbers for different RRU, the number M may increase.

Advantages of the present invention include: (a) The microwave converter at each RRU has only one individual target frequency to convert to, which simplifies the design and reduces the cost: (b) There is no need for the separation band between the uplink and the down link; (c) There is a uniform configuration for LTE, GSM, UMTS, and Wi-Fi signals (the only difference is in BBU); and (d) Different numbers of antennas can be implemented, which saves bandwidth and extends the application scope and increases the deployment flexibility.

In practice, the limitations of the components have to be taken into account. Such limitations include, for example, electrical-optical modulation band limits; cost and power consumption of the laser; coherent interference (cross talk); microwave frequency converter complexity; microwave component quality, and the like.

In certain embodiments, the direct laser generator has a modulation bandwidth 2.6 GHz. If the light frequency is the reference (i.e. corresponds to DC), then only 2.6 GHz is used to carry the RF signals. First, since the lower part of the bandwidth needs to be reserved to collect the inter-modulation noise, while at same time to apply to GPON type services, 1 GHz is reserved. Thus, 1.6 GHz is available to carry the RF signals from 8 antennas. If the guard band is equal to the signal bandwidth (i.e. G=W), then adding on an additional band of 20 MHz for the synchronization and management yields 20+8*(G+W)=20+16*W=340 MHz, 660 MHz, 1620 MHz. As such, if the bandwidth is 20 MHz, each RRU needs 340 MHz, and this wavelength can carry 3 RRU. If the bandwidth is 40 MHz, then only 2 RRU can be carried. For a 100 MHz bandwidth, only one RRU can be carried. With 15 wave lengths carrying the uplink and another 15 wavelengths carrying downlink, a single fiber can carry 15 to 45 RRUs.

FIG. 14 illustrates realistic multiplex and FIG. 14.5 illustrates the different configuration and capacity per fiber (assume 30 lambdas generated with modulation bandwidth 2.6 GHz and LTE band usage). The most representative configuration is indicated in bold. All this is based on a working bandwidth of 2.6 GHz, which is at the lower bound of the available components in the market.

Certain low power embodiments of the present invention are possible. The aforementioned implementations implied that at each RRU there is a laser generator, and correspondingly there is laser generator at the BBU, to provide the light source for the down link and uplink, respectively. Because laser generation currently requires more power than a microwave component, the implementation can be modified to reduce the power consumption (as well as the component price), by replacing the laser generator by an optical intensity modulator (IM). To enable this configuration, all RRUs that are attached to a BBU are connected through a single fiber in the shape of a ring. Only one laser source is needed, as long as the distance is within the range posed by the quality requirement.

FIG. 15, for example, shows a ring of a single fiber linking all RRUs associated with a single BBU, where the IMs refer to the transmitter and the boxes behind the IMs refer to the receiving side. At the BBU, there is a bank of lasers (ECL), each of which generates a single lambda light continuous wave (CW) in one direction along the ring that terminates at the same BBU. For the uplink, an IM at each RRU modulates the same light beam, using its own RF signal, at the corresponding wavelength designated for the uplink at this RRU, and the signal is extracted by a bandpass filter at each RRU and converted to the corresponding RF signal. For the down link, there are multiple IMs, each of which modulates a certain wavelength corresponding to the designated RRU, using the corresponding RF signals designated to the same RRU. The radio uplink corresponds to the up stream, and the down link corresponds to down stream in light signal on the fiber.

The technology needed to enable certain embodiments of the present invention is already mature. Indeed, commercial laser generators, modulators, circulators, filters, and switches are all available. For instance, http://www.miteq.com/results.php?ID=27548100&rpp=&cs=&st=fo&sort=(Freq-MaxM Hz-FreqMinMHz)+desc, quotes a laser transmitter with a maximum working frequency band from 2.2 GHz (the cheapest) up to 18 GHz (the most expensive). Taking an average, we can estimate a mature product as having 10 GHz upper band-limit. This is further confirmed by the intensity modulator offered as http://www.thorlabs.com/newqrouppage9.cfm?objectgroup id=3918. FIG. 15.5, for example, illustrates technology to enable certain embodiments of the present WDM-RAN invention.

A HF up-converter and down-converter are used at the RRU and the BBU, respectively. Its function is to separate the different ports of the antenna on the frequency band so that they can be transmitted verbatim with the same bandwidth. For the uplink, each of those signals is received at the BBU at a different frequency and thus can be down-converted to the base band, allowing spatial differentiation of MIMO signals. For the down link, each of those signals is converted down to the carrier frequency at the RRU to feed different antenna ports. It can be understood as space to frequency, and frequency to space, in both directions. FIG. 16 shows a HF converter. FIG. 17 illustrates CPRI transmission capability and FIG. 18 illustrates transmission capability.

While embodiments of the methods and systems have been shown and described, it will be apparent to those skilled in the art that many more modifications are possible without departing from the inventive concepts herein. The invention, therefore, is not to be restricted except in the spirit of the following claims.

The invention claimed is:

1. A method of optically transmitting an uplink signal and a downlink signal in a fiber comprising:
   multiplexing a number of MIMO uplink channels resulting in an uplink signal, wherein a guard band is included for each multiplexed MIMO uplink channel;
   multiplexing a number of MIMO downlink channels resulting in a downlink signal, wherein a guard band is included for each multiplexed MIMO downlink channel; and
   optically transmitting, through a fiber, (i) the uplink signal on a first carrier, and (ii) the downlink signal on a second carrier;
   wherein a separation band is included between the uplink signal and the downlink signal.

2. A method of optical transmission over fiber, between a plurality of RRUs and a BBU, comprising:
- generating, by a laser source, a plurality of wavelengths, each wavelength assigned to at least one RRU;
- converting (i) a first carrier from different antenna ports by an RRU-side carrier converter, and (ii) a second carrier for the different antenna ports by a BBU side carrier converter; wherein the first and second carriers are separated by a separation band; and
- transmitting (i) a first light beam to the BBU through a fiber, and (ii) a second light beam to the at least one RRU through the fiber; wherein the first light beam corresponds to the first carrier and the second light beam corresponds to the second carrier.

3. The method of claim 2, wherein 30 wavelengths are generated.

4. The method of claim 2, wherein the first and second carriers include guard bands corresponding to each port.

5. The method of claim 2, further comprising converting, by a microwave frequency converter, antenna interfaces from the antenna ports into adjacent identical frequency bands above a system carrier frequency.

6. The method of claim 2, further comprising: assigning the antenna ports to different carriers; and coherently generating, by a single light source, the different carriers.

7. The method of claim 6, further comprising multiplexing antenna ports from different RRUs into the different carriers.

8. The method of claim 2, wherein the transmitting is by a first and second laser generator.

9. The method of claim 2, wherein the plurality of RRUs are connected through a single fiber in the shape of a ring.

10. The method of claim 9, wherein the transmitting is by optical intensity modulators.

11. The method of claim 2, further comprising transmitting a control channel for the at least one RRU.

12. A method of optical transmission over fiber, between a plurality of RRUs and a BBU, comprising:
- generating, by a laser source, X wavelengths, each wavelength assigned to at least one RRU;
- separating the X wavelengths into X/2 uplink wavelengths and X/2 downlink wavelengths, wherein a separation band does not separate the uplink wavelengths and the downlink wavelengths;
- optically transmitting (i) the uplink wavelengths to the BBU, and (ii) the downlink wavelengths to the at least one RRU; and
- converting, by a microwave frequency converter, signals from respective antenna interfaces of respective antenna ports into adjacent identical frequency bands above a system carrier frequency.

13. The method of claim 12, wherein X is 30 and X/2 is 15.

14. The method of claim 12, further comprising multiplexing GSM signals with UMTS or LTE.

15. The method of claim 12, further comprising:
assigning antenna ports to different light carriers; and
coherently generating, by a single light source, the different light carriers.

16. The method of claim 15, further comprising multiplexing the converted signals from the antenna ports of a plurality of different RRUs into the different light carriers.

17. The method of claim 12, further wherein the optically transmitting is by laser generators.

18. The method of claim 12, wherein the plurality of RRUs are connected through a single fiber in the shape of a ring.

19. The method of claim 18, wherein the optically transmitting is by optical intensity modulators.

20. The method of claim 12, further comprising transmitting a control channel for the plurality of RRUs.

21. A system of optically transmitting an uplink signal and a downlink signal in a fiber comprising:
- means for multiplexing a number of MIMO uplink channels resulting in an uplink signal, wherein a guard band is included for each multiplexed MIMO uplink channel;
- means for multiplexing a number of MIMO downlink channels resulting in a downlink signal, wherein a guard band is included for each multiplexed MIMO downlink channel; and
- means for optically transmitting, through a fiber, (i) the uplink signal on a first carrier, and (ii) the downlink signal on a second carrier;
- wherein a separation band is included between the uplink signal and the downlink signal.

22. A system of optical transmission over fiber, between a plurality of RRUs and a BBU, comprising:
- means for generating a plurality of wavelengths, each wavelength assigned to at least one RRU;
- means for converting (i) a first carrier from different antenna ports by an RRU-side carrier converter, and (ii) a second carrier for the different antenna ports by a BBU-side carrier converter; wherein the first and second carriers are separated by a separation band; and
- means for transmitting (i) a first light beam to the BBU through a fiber, and (ii) a second light beam to the at least one RRU through a fiber; wherein the first light beam corresponds to the first carrier and the second light beam corresponds to the second carrier.

23. The system of claim 22, wherein 30 wavelengths are generated.

24. The system of claim 22, wherein the first and second carriers include guard bands corresponding to each port.

25. The system of claim 22, further comprising means for converting antenna interfaces from the antenna ports into adjacent identical frequency bands above a system carrier frequency.

26. The system of claim 22, further comprising: means for assigning the antenna ports to different carriers; and means for coherently generating the different carriers.

27. The system of claim 26, further comprising means for multiplexing antenna ports from different RRUs into the different carriers.

28. The system of claim 22, wherein the plurality of RRUs are connected through a single fiber in the shape of a ring.

29. The system of claim 22, further comprising means for transmitting a control channel for the at least one RRU.

30. A system of optical transmission over fiber, between a plurality of RRUs and a BBU, comprising:
- means for generating X wavelengths, each wavelength assigned to at least one RRU;
- means for separating the X wavelengths into X/2 uplink wavelengths and X/2 downlink wavelengths, wherein a separation band does not separate the uplink wavelengths and the downlink wavelengths;
- means for optically transmitting (i) the uplink wavelengths to the BBU, and (ii) the downlink wavelengths to the at least one RRU; and
- means for converting respective antenna interfaces of respective antenna ports into adjacent identical frequency bands above a system carrier frequency.

31. The system of claim 30, wherein X is 30 and X/2 is 15.

32. The system of claim 30, further comprising means for multiplexing with GSM signals with UMTS or LTE.

33. The system of claim 30, further comprising: means for assigning antenna ports to different light carriers; and means for coherently generating the different light carriers.

34. The system of claim 33, further comprising means for multiplexing the converted signals from the antenna ports of a plurality of different RRUs into the different light carriers.

35. The system of claim 30, wherein the plurality of RRUs are connected through a single fiber in the shape of a ring.

36. The system of claim 30, further comprising means for transmitting a control channel for the plurality of RRUs.

* * * * *